Figure 1:
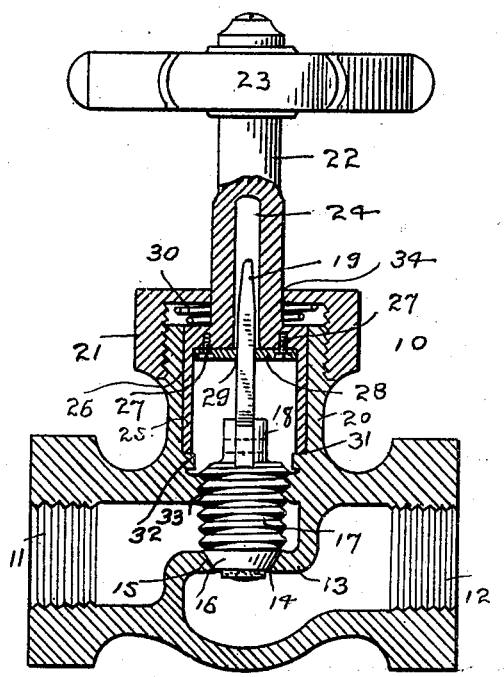

J. KOBUS.
NON-LEAKING VALVE.
APPLICATION FILED JAN. 11, 1909.

922,294.

Patented May 18, 1909.

Witnesses.
H. A. Lamb.
S. W. Atherton.

Inventor
Jacob Kobus
By Attorney
A. M. Wooster

UNITED STATES PATENT OFFICE.

JACOB KOBUS, OF BRIDGEPORT, CONNECTICUT.

NON-LEAKING VALVE.

No. 922,294.      Specification of Letters Patent.      Patented May 18, 1909.

Application filed January 11, 1909. Serial No. 471,571.

*To all whom it may concern:*

Be it known that I, JACOB KOBUS, a citizen of the United States, residing at Bridgeport, county of Fairfield, State of Connecticut, have invented a new and useful Non-Leaking Valve, of which the following is a specification.

This invention has for its object to provide a valve adapted for general use as in connection with gas, steam and water fittings, as radiators, and especially adapted for use as an ammonia valve, which shall be simple and inexpensive to produce, durable, shall be made without packing and be permanently non-leaking as it is self-adjusting to compensate for wear.

With these and other objects in view I have devised the novel valve which I will now describe, referring to the accompanying drawing forming a part of this specification and using reference characters to indicate the several parts.

Figure 2:
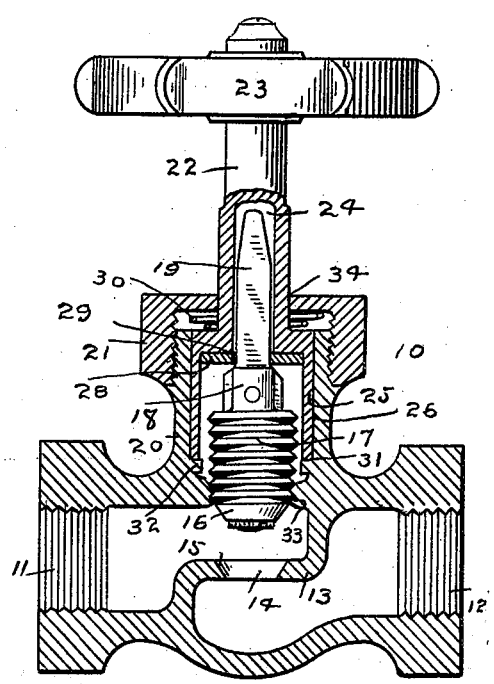
Figure 3:
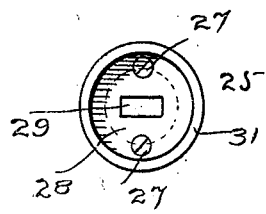

Figure 1 is a longitudinal section of my novel valve with the gate in the closed position; Fig. 2 a similar view with the gate in the open position; and Fig. 3 is an inverted plan view of the sealing cup detached.

10 denotes a case having the usual internally threaded hubs 11 and 12 for the attachment of pipes and a cross wall 13 having an opening 14 through it, said opening being beveled upon the upper side to form a seat 15.

16 denotes the gate which is formed at the lower end of a threaded gate body 17, said gate body being provided with a boss 18 to which an angular stem 19, shown as flattened, is rigidly secured.

Upon the upper side of the case in the position shown is an externally threaded hub 20 which is engaged by a cap 21.

22 denotes a shank, having rotary movement only, which passes through a central opening 34 in the cap and is provided with a hand wheel 23 for convenience in operation and with a central opening 24 extending into the lower end thereof, and carries at its lower end a sealing cup 25 which fits closely but is adapted to turn in an opening 26 in hub 20. Boss 18 and the upper end of the gate body are adapted to move upward into the sealing cup, as clearly shown in Fig. 2, when the valve is opened. At the base of the cup and rigidly secured thereto, as by screws 27, is a disk 28 having an opening 29 which corresponds with and just receives the stem of the valve, holding said stem against rotation independently of the cup but permitting it to slide freely longitudinally as the valve is opened or closed, as will be more fully explained.

30 denotes a spring which lies under the cap, surrounds the shank and bears against the cup but not against hub 20. The action of this spring is to hold the edge of the sealing cup, specifically indicated by 31, closely in engagement with a circular shoulder 32 on the inner side of hub 20. The end or edge of the cup and the shoulder are made to correspond perfectly so that the cup seats tightly on the shoulder and forms a perfectly tight seal against the passage of gas, steam or water, my novel valve being in practice permanently non-leaking and fully meeting the requirements of an ammonia valve. Below shoulder 32 on the inner side of hub 20 is a female thread 33 which is engaged by the thread on gate body 17.

The operation will be obvious from the drawing. Rotation of the shank by means of the hand will rotate the sealing cup but without any tendency to raise it from the shoulder with which the edge of the cup is retained in close engagement by the spring. Rotation of the shank will also rotate the gate body and gate through the engagement of the stem with opening 29 in the disk and the gate will be raised or lowered thereby through the engagement of the thread on the gate body with female thread 33. When the shank is rotated in one direction, the gate will be moved downward into engagement with the seat as in Fig. 1, and when the shank is rotated in the opposite direction, the gate will be raised until its upward movement is stopped by the engagement of boss 18 with disk 28 as in Fig. 2. Under no circumstances, however, is the edge of the sealing cup raised from the circular shoulder so that there can be no escape of gas, steam or water past the shoulder and the spring makes it self-adjusting to compensate for wear, and as opening 24 in the shank only extends into the shank far enough to receive the stem, it is obvious that there can be no leakage of gas, steam or water at any place.

Having thus described my invention I claim:

1. A valve comprising a case having a seat, a female thread and a circular shoulder, a gate having a threaded body engaging the female thread and a stem, a shank having rotary movement only which is engaged by the stem and permits longitudinal movement thereof, a sealing cup carried by the shank and having a lower edge engaging said shoulder, and means for pressing the sealing cup toward said shoulder.

2. A valve comprising a gate carried by a threaded body and having a stem, a shank having rotary movement only and a sealing cup carried by the shank and engaged by the stem, and having a lower edge, and means coöperating with said lower edge to form a tight joint.

3. A valve comprising a case having an opening through it with a cross wall having a seat and a hub having a central opening with a circular shoulder and a female thread, a gate having a body threaded to engage the female thread and a stem, a shank having rotary movement only and engaged by the stem, a sealing cup carried by the shank and having its edge engaging the shoulder, and a spring for holding the edge of the cup and the shoulder in close contact.

4. A valve comprising a case having a seat, a thread and a circular shoulder, a gate having a body threaded to engage the thread on the body and a stem, a shank having rotary movement only which carries the stem and permits longitudinal movement thereof, a sealing cup also carried by the stem and having a lower edge engaging the shoulder and a spring bearing on the cup, substantially as described, for the purpose specified.

5. In a valve, the combination with a case provided with a seat and a hub having a circular shoulder and a female thread, of a shank having rotary movement only and provided with a central opening at its lower end and carrying a sealing cup having a lower edge engaging the shoulder, means for retaining the cup in the engaging position and a gate having a body threaded to engage the female thread and a stem carried by the shank and having longitudinal movement in the opening.

6. In a valve, the combination with a case having a seat and a hub provided with a circular shoulder and a female thread, of a shank having rotary movement only and provided with a central opening, a sealing cup carried by the shank and engaging the shoulder, a spring bearing on the cup, a disk secured in the cup and having an angular opening in alinement with the opening in the shank, and a gate having a body threaded to engage the female thread and an angular stem engaging the opening in the disk and having longitudinal movement in the opening in the shank.

In testimony whereof I affix my signature, in presence of two witnesses.

JACOB KOBUS.

Witnesses:
  A. M. WOOSTER,
  S. W. ATHERTON.